F. H. FULLER.

PAPER MAKING MACHINE.

APPLICATION FILED AUG. 21, 1913.

Reissued June 16, 1914.

13,749.

2 SHEETS—SHEET 1.

Witnesses:
L. Broderick
J. Freudenwall

Inventor
Frederick H. Fuller,
By his Attorneys
Prindle & Albright.

F. H. FULLER.

PAPER MAKING MACHINE.

APPLICATION FILED AUG. 21, 1913.

Reissued June 16, 1914.

13,749

2 SHEETS—SHEET 2.

Witnesses:
L. Broderick
J. Freudenvoll

Inventor
Frederick H. Fuller,
By his Attorneys
Prindle & Wright.

UNITED STATES PATENT OFFICE.

FREDERICK H. FULLER, OF POTSDAM, NEW YORK, ASSIGNOR, BY DIRECT AND MESNE ASSIGNMENTS, TO TOMPKINS-HAWLEY-FULLER COMPANY, A CORPORATION.

PAPER-MAKING MACHINE.

13,749. Specification of Reissued Letters Patent. Reissued June 16, 1914.

Original No. 1,013,288, dated January 2, 1912, Serial No. 561,561. Application for reissue filed August 21, 1913. Serial No. 785,914.

*To all whom it may concern:*

Be it known that I, FREDERICK H. FULLER, a citizen of the United States, residing at Potsdam, in the county of St. Lawrence and State of New York, have invented certain new and useful Improvements in Paper-Making Machines; and I do hereby declare the following to be a full, clear, and exact description of the invention, such as will enable others skilled in the art to which it appertains to make and use the same.

My invention relates to paper machines, and especially to machines for handling tissue or other thin papers. Its object is to prevent such papers from sticking to the upper metal press-roll and to cause the sheet of tissue or other thin paper to be carried by a felt running under the top press-roll immediately to and around a large part of the circumference of the first drier.

This invention is especially applicable to the Harper-Fourdrinier type of machine, but is also applicable to other paper machines as, for example, to those of the cylinder type.

Figure 1:
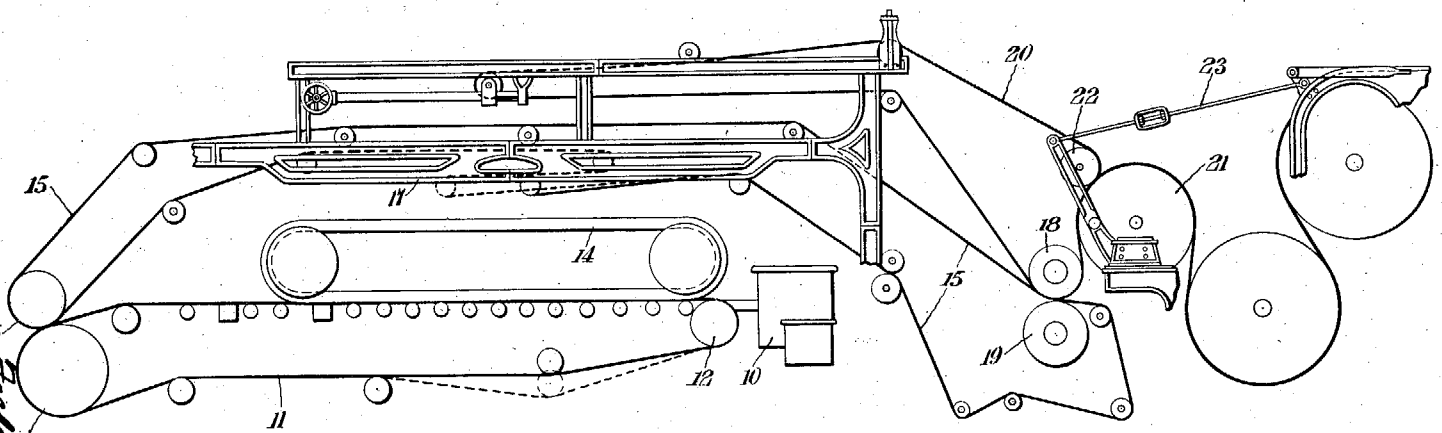
Figure 2:
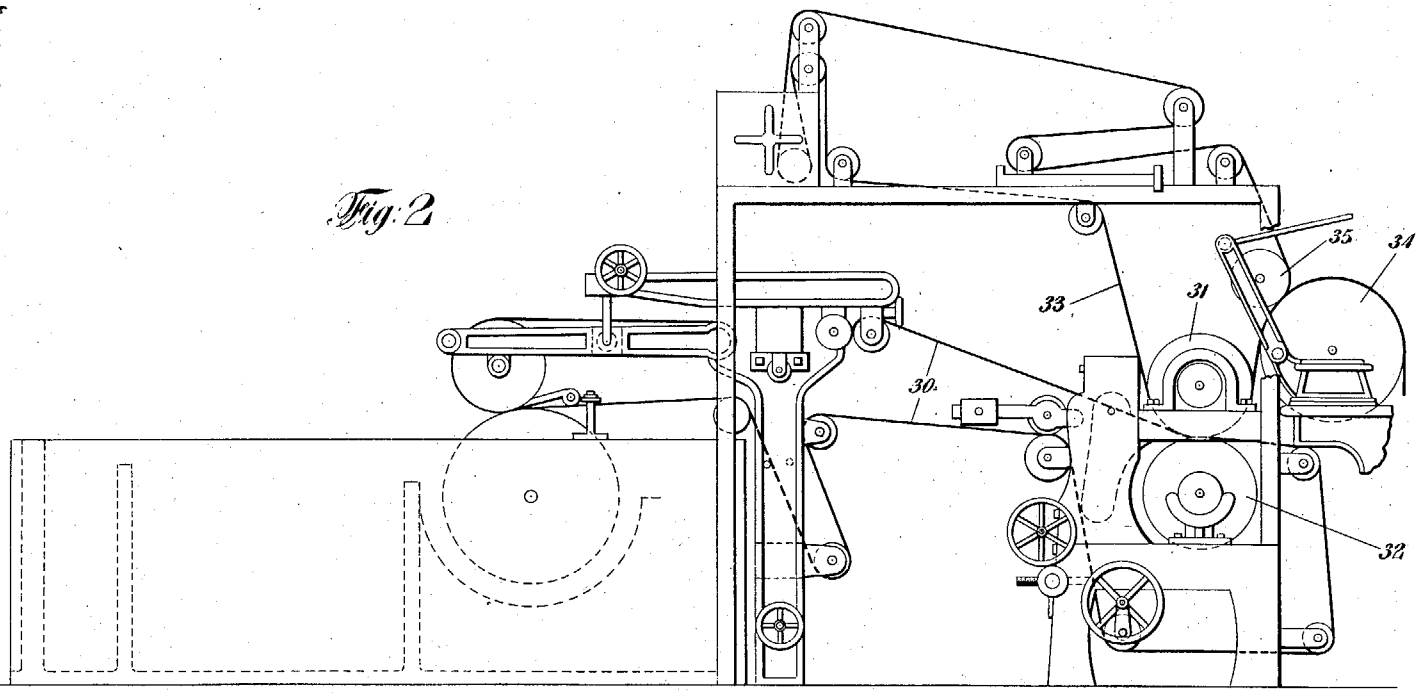

In the accompanying drawings, Figure 1, while in some respects a side elevation and section is, in effect, a diagrammatic illustration of my invention as applied to a Harper-Fourdrinier machine; and Fig. 2 is a similar illustration of my invention applied to a cylinder machine.

In Fig. 1, 10 represents a head-box from which the pulp flows to the making wire 11, having the usual tension devices, suction-boxes, etc., and traveling around a breast-roll 12 and a couch-roll 13, and the width of the pulp course being, as usual, regulated by deckle-straps 14. The layer of pulp is transferred from the making-wire to the press-felt 15, which travels around an upper couch-roll 16 and over customary tension-rolls, etc., located on a frame 17, and elsewhere. The press-felt, pursuing the course indicated in the drawing, passes between an upper metal-surfaced press-roll 18 and a lower rubber-faced press-roll 19, and thence outward, downward and back to the starting point. 20 is a top felt running to or through adjusting and tensioning devices in the frame 17, and thence between the press-rolls 18 and 19 above the press-felt 15 and from the press-roll 18 almost directly upward against the circumference of the first drier, this drier being of a series as illustrated. The felt 20 passes from the circumference of the drier 21 around a rubber-covered roll 22, which may be adjustably regulated by means of a hand-lever device 23.

In Fig. 2 the familiar features of a cylinder machine are illustrated, and a press-felt 30 is shown as running between a metal-surfaced press-roll 31 and a lower rubber-covered press-roll 32, and thence down and back to the front of the machine. The top felt is illustrated at 33 as passing about various tensioning and guiding devices in the upper part of the machine and running between the press-rolls 31 and 32, and thence directly upward against the circumference of the drier 34, and thence around the rubber-covered adjustable roll 35 to the upper frame.

In both figures the paper is indicated as passing around and from the driers.

I have not detailed the connection between the adjusting means 23 and the rolls 22 or 35, as that connection is mechanically obvious; and does not require an additional view. It will be observed that in these constructions the paper passes between two felts as they run between the press-rolls so that no opportunity is given the tissue or other thin paper to stick to the upper press-roll. This is possible because of the relative arrangement of the felts, the press-roll, the first drier, and the roll 22 or 35 running against the first drier. This arrangement also permits the paper from the press to be taken almost immediately to the first drier.

In passing from the apron to the first drier, it will be observed that the sheet of paper travels in a forward direction in which gravity does not substantially tend to hold it against the apron, but on the other hand, in my particular embodiment of the invention gravity tends to press the paper upon the drier-roll and to free it from the apron. To any extent to which I have eliminated the tendency of gravity to force the sheet of paper against the apron, and to the extent to which I have utilized the force of gravity against the first drier, I have reduced the pressure necessary to apply such apron to cause the paper to stick to the first drier.

In addition to the marked advantages of preventing the paper from sticking to the upper press-roll and carrying it on the under side of the top felt immediately to the first drier I secure also the advantage of using a common and familiar equipment, while at the same time obtaining the full benefit of the first drier by carrying the paper in contact with a large part of its area. In fact, the paper as it passes up from the press-rolls hugs the adjacent portion of the circumference of the first drying cylinder, before it passes over the upper and outer part of the circumference, or, in other words, first contacts with the drier and leaves it at substantially diametrically opposite points, or at points below the line of a horizontal diameter of the drier.

I claim:—

1. In a paper making machine, the combination of press rolls, a drier, a bottom felt and a top felt, the bottom felt passing between the press rolls, the top felt passing from the upper press roll to and into contact with the drier, and another roll for pressing the top felt against the drier at or above the level of the axis of the drier.

2. In a paper making machine, the combination of a couch roll, press rolls, a drier, a bottom felt and a top felt, the bottom felt passing around the couch roll and between the press rolls, the top felt passing from the upper press roll to and into contact with the drier, and another roll for pressing the top felt against the drier at or above the level of the axis of the drier.

3. In a paper making machine, the combination of couch rolls, press rolls, a drier, a bottom felt and a top felt, the bottom felt passing around the couch roll and between the press rolls, the top felt passing between the press rolls and in contact with the drier, and another roll for pressing the top felt against the drier at or above the level of the axis of the drier.

4. In a paper making machine, the combination of press rolls, a drier, a bottom felt and a top felt, and an adjustable roll bearing upon the drier, the bottom felt passing around the couch roll and between the press rolls, and the top felt passing between the press rolls and around said roll bearing against the drier, the axis of said last mentioned roll being at least as high as the axis of the drier, and the arc of contact of the top felt and drier being relatively short.

5. In a paper making machine, the combination of couch rolls, press rolls, a drier, a bottom felt and a top felt, and an adjustable roll bearing upon the drier, the bottom felt passing around the couch rolls and between the press rolls, the top felt also passing between the press rolls and between the adjustable roll and the drier, the axis of the adjustable roll being substantially higher than the axis of said drier.

6. In a paper making machine, the combination of press rolls, a bottom felt and a top felt, a drier, and an adjustable roll bearing upon the drier at a point substantially above the axis of the latter, both felts passing between the press rolls, and the top felt passing between the adjustable roll and the drier, said top felt leaving contact with said paper and drier at the point of contact of said adjustable roll and drier.

7. In a paper making machine, the combination of couch rolls, press rolls, a drier, a bottom felt and a top felt, the bottom felt passing around the couch roll and between the press rolls, the top felt passing between the press rolls and in contact with the drier, and a roll for pressing the top felt against the drier above the level of the axis of the drier, said top felt having a substantial arc of contact with the drier before it reaches said last mentioned roll.

FREDERICK H. FULLER.

Witnesses:

FREDERIC A. WEED,
L. H. PELTEN.